No. 677,483. Patented July 2, 1901.
R. J. WELLES.
CHAIR BEDSTEAD.
(Application filed Dec. 10, 1900.)
(No Model.) 3 Sheets—Sheet 1.
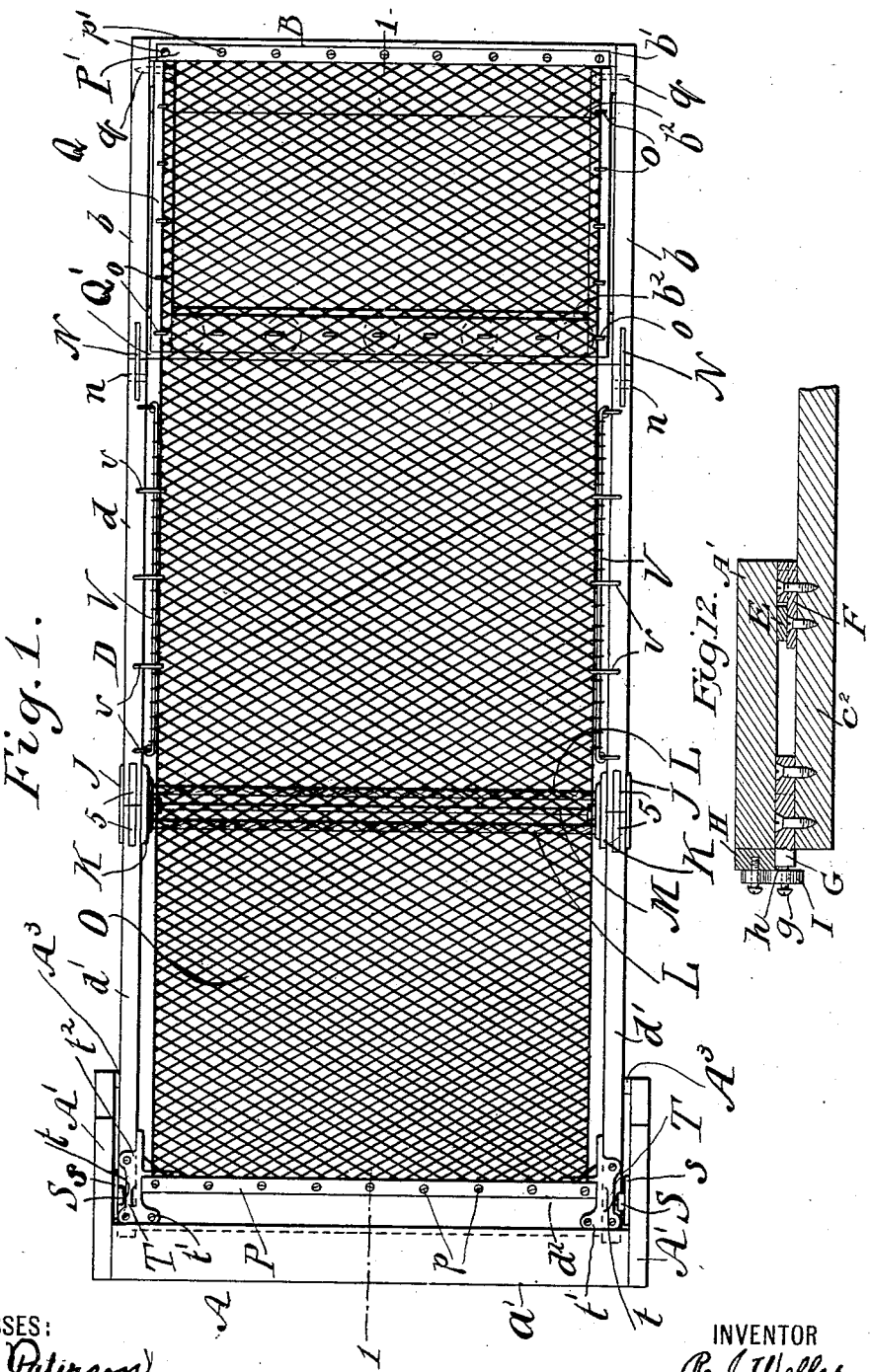
WITNESSES:
Belle Paterson
Sophie Harnisch
INVENTOR
R. J. Welles
BY
ATTORNEYS

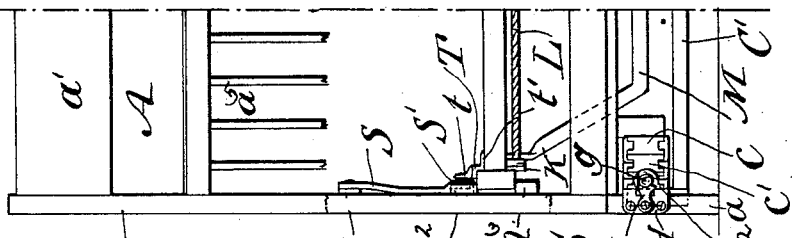
No. 677,483. Patented July 2, 1901.
R. J. WELLES.
CHAIR BEDSTEAD.
(Application filed Dec. 10, 1900.)
(No Model.) 3 Sheets—Sheet 2.
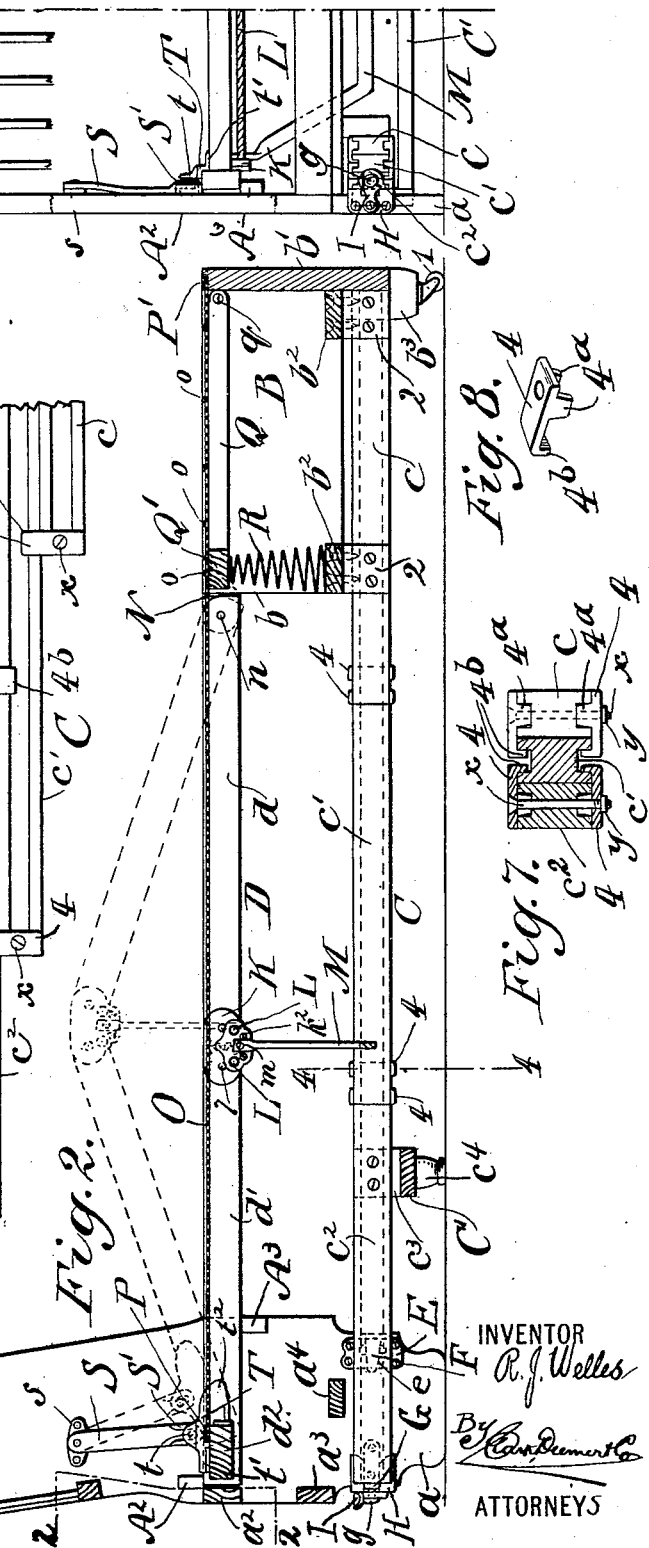
WITNESSES:
J. Harnisch.
B. Peterson.
INVENTOR
R. J. Welles
By Van Deemer & Co.
ATTORNEYS
THE NORRIS PETERS CO., PHOTO-LITHO., WASHINGTON, D. C.

No. 677,483. Patented July 2, 1901.
R. J. WELLES.
CHAIR BEDSTEAD.
(Application filed Dec. 10, 1900.)
(No Model.) 3 Sheets—Sheet 3.
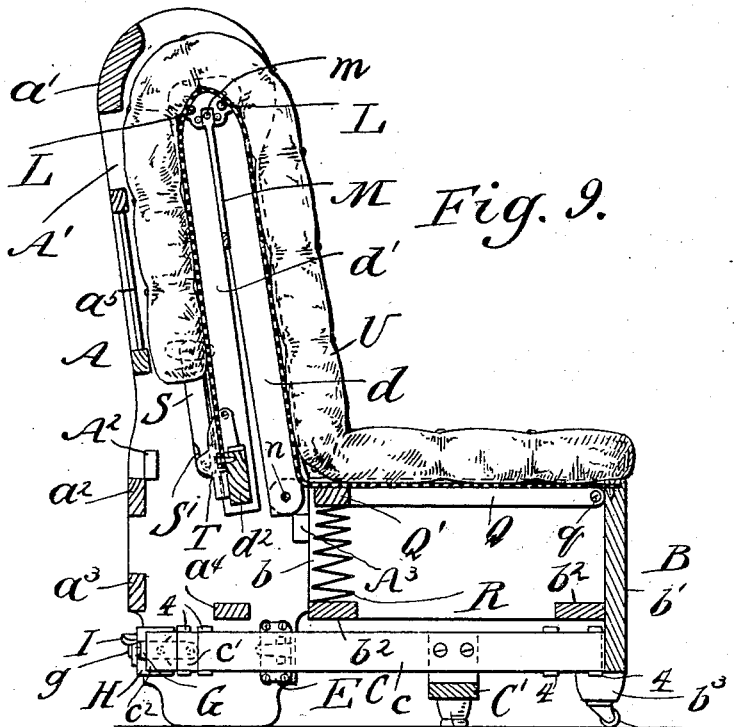
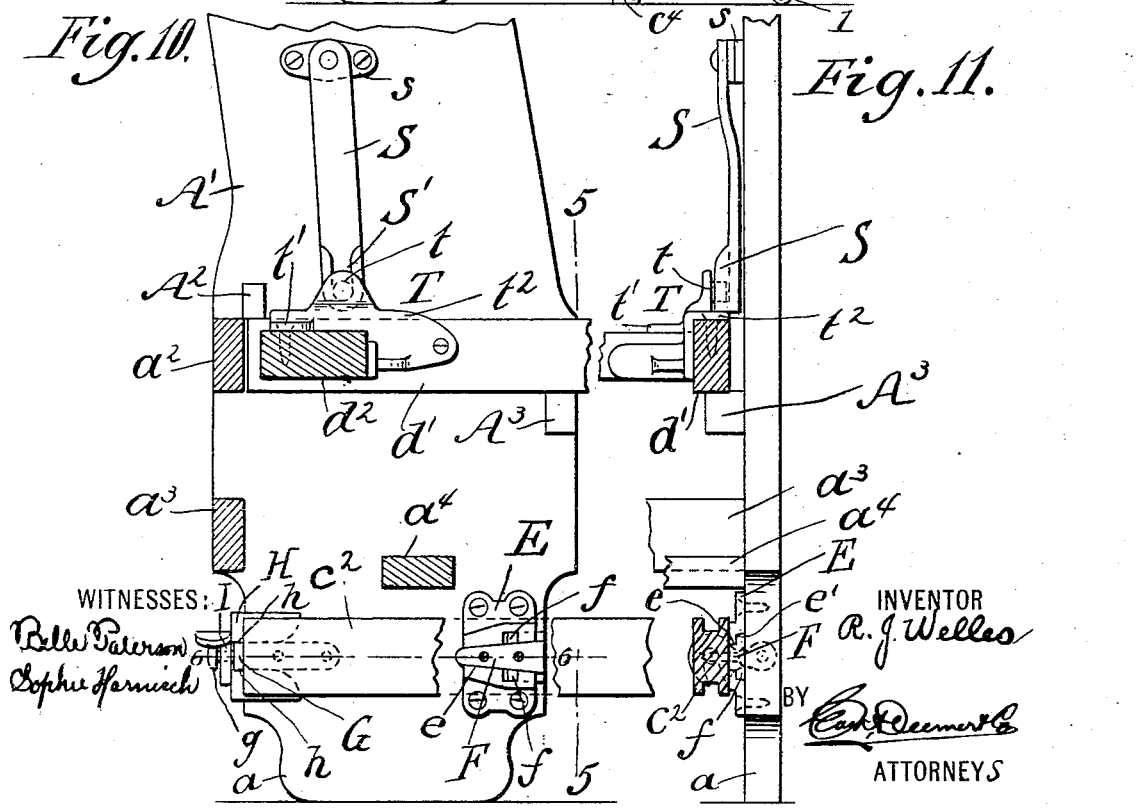

UNITED STATES PATENT OFFICE.

RICHARD J. WELLES, OF NEW YORK, N. Y., ASSIGNOR, BY MESNE ASSIGN-MENTS, TO THE WELLES MANUFACTURING COMPANY, OF SAME PLACE.

CHAIR-BEDSTEAD.

SPECIFICATION forming part of Letters Patent No. 677,483, dated July 2, 1901.

Application filed December 10, 1900. Serial No. 39,308. (No model.)

*To all whom it may concern:*

Be it known that I, RICHARD J. WELLES, a citizen of the United States, and a resident of New York, county of New York, and State of New York, have invented certain new and useful Improvements in Chair-Bedsteads, of which the following is a specification, reference being had to the accompanying drawings, forming a part thereof, in which similar characters of reference indicate corresponding parts.

This invention relates to chair-bedsteads; and the object thereof is to provide a novel structure embodying a combination chair and bedstead which is adapted to be readily converted into its two respective forms and which normally carries the necessary bedclothing, springs, mattress, &c., whereby such clothing will serve at all times whether the device is used as a chair or as a bed.

The construction is simple, durable, and inexpensive.

The device is susceptible of being readily disassembled for purposes of cleansing, and its several parts can be conveniently packed into small space for transportation.

The invention will be hereinafter fully described, and specifically set forth in the annexed claims.

In the accompanying drawings, forming part of this specification, Figure 1 is a plan view of the device, showing the same in position for use as a bed; Fig. 2, a longitudinal sectional elevation taken on a line 1 1 of Fig. 1; Fig. 3, a rear elevation of the device shown partly in section on the line 2 2 of Fig. 2; Fig. 4, an enlarged detail side view showing a portion of one of the folding side rails of the device; Fig. 5, a cross-sectional elevation on the line 3 3 of Fig. 4; Fig. 6, a plan view of a part of one of the telescopic lower rails of the device; Fig. 7, a cross-sectional detail elevation taken on the line 4 4 of Fig. 2; Fig. 8, a perspective view of one of the clamps employed to connect the slides of the said telescopic rail; Fig. 9, a vertical sectional elevation of the device in position for use as a chair; Fig. 10, an enlarged vertical sectional elevation illustrating some details of the structure. Fig. 11 is a vertical sectional elevation taken on the line 5 5 of Fig. 10, and Fig. 12 is a detail sectional plan view taken on the line 6 6 of Fig. 10.

In the practice of my invention as illustrated in the drawings I employ, primarily, a stationary upright head or back A and a sliding seat or box portion B, which parts are connected to each other by means of the lower telescopic rails C and the upper folding rails D. The head A embodies the side upright walls A', having the legs $a$ formed integral therewith, suitable cross-beams, as $a'$, $a^2$, $a^3$, and $a^4$, and an ornamental rack $a^5$, and the seat or sliding portion B embodies the side walls $b$, front wall $b'$, cross-beams $b^2$, and the legs $b^3$, having the casters, as 1.

Connected to the box B by means of blocks 2, which are fastened to the cross-beams $b^2$, is the forward section or slide $c$ of each telescopic lower rail C. This said slide is connected to the slide-section $c'$ by means of clamps 4, which engage upper and lower grooves, which the slides forming the telescopic rails C are respectively supplied with, and the rearward slide $c^2$ is also connected to said slide $c'$ by means of similar clamps. The oppositely-located rearward slide-sections $c^2$ are connected by means of a cross-beam C', which is secured to blocks $c^3$, fastened to the slides $c^2$, and this beam is supported on suitable legs $c^4$, whereby the slides are maintained in horizontal position. Each of the said clamps 4 is provided with lugs $4^a$ for engaging the grooves of the slides and with a flange $4^b$ for clamping the slides together, and they are secured to the slides by means of bolts $x$ and nuts $y$, as clearly shown by Fig. 7 of the drawings. As a means for detachably connecting the rearward slides $c^2$ of the telescopic rails C to the head A each side wall A' of said head is provided at its lower part with a plate E, having a tapering groove $e$ therein, which engages a tapering tongue F, which is secured to the outer surface of the slide $c^2$. The plate E is further provided with rearwardly-formed grooves $e'$, which engage wings $f$, formed on the tongue F, whereby the said tongue can be securely locked within the plate E. A tongue or plate G is also secured to each rearward slide $c^2$, and this tongue engages a groove $h$ of an angle-iron plate H, secured to the respective side walls A' of the head A. Each of these said tongues G has a knob $g$, which engages a hook I, pivotally attached to the plate H, whereby the slide $c^2$ is securely held in position; but at the same time an efficient means for disconnecting the parts is provided.

The upper side rails D embody, respectively, the sections $d$ and $d'$, which are connected to each other by the interlocking toothed segments 5, which are held in grooves 6, formed, respectively, in the adjacent ends of the sections $d$ and $d'$, and these said segments are held in place by means of bolts or rivets, as 7, which pass through connecting-plates J and K, which connect the sections $d$ and $d'$ to each other. Each inner plate K is provided with a recessed lower portion K', having openings $k$ therethrough for receiving the ends of flexible cables L, which are employed to prevent sagging of the bed-spring while the device is being converted into a chair, as will be hereinafter described. The ends of these said cables are securely clamped in place by means of the plate $k'$ and the screws $k^2$. As a means for strengthening the structure a metallic U-shaped cross-brace M is extended between the two oppositely-located plates K and secured thereto by means of screws $m$. It will be noted that, because of the connection of the ends of the rail-sections $d$ and $d'$ by the segments 5, this said brace M will always maintain a position at right angles to the plates K, whereby said brace cannot interfere with the successful operation of the device. The forward end of the section $d$ of each rail D is pivotally attached to the box B by means of pivots $n$, which pass through the plates N, which are fastened within grooves of each side wall of the said box.

Connecting the two opposite sections $d'$ of the rails D is a cross-beam $d^2$, which supports one end of a woven-wire spring O, the said end being connected by means of the plate P and the screws $p$. The other or outer end of this said spring is connected to the front wall $b'$ of the box B by means of the plate P' and the screws $p'$. The outer end portion of this said spring also rests upon a swinging U-shaped frame Q, which is pivoted to the side walls of the box B by means of screws $q$, whereby said frame can swing downwardly when pressure is exerted thereon, thereby providing a seat which will readily accommodate the user by assuming varying angles in required relative arrangement with the seat-back when the device is used as a chair. To keep this said frame in a normally horizontal position, a series of spiral springs R are placed between the cross-piece Q' of the frame Q and the cross-beam $b^2$ of the box B.

As a means for supporting the inner ends of each rail D, I provide swinging hangers S, which are respectively pivoted to plates $s$, screwed to the side walls of the head A. These hangers are respectively provided with a U-shaped socket S', which engage studs $t$ of metallic brackets T, which are connected to the inner sections $d'$ of the side rails D. Each of these brackets embodies a flange $t'$ for connection with the cross-beam $d^2$ and a flange $t^2$ for connection with the inner sections $d'$ of the rail D, whereby a strong structure is provided. This swinging arrangement of the hangers S for supporting the folding rails D permits of stretching the woven-wire spring O after the sliding rails C are extended to their fullest extent, as illustrated by Fig. 2 of the drawings, whereby when the device is used as a bed the said spring is maintained in taut horizontal position. This feature of my invention enables me to use a continuous spring and is a distinctive improvement, because if the inner ends of the rails D were pivoted to fixed hangers this stretching action could not be accomplished.

As a further means for maintaining the horizontal normal position of the woven-wire spring the inner section $d'$ of each rail D is held in rigid horizontal position between blocks $A^2$ and $A^3$, which are extended from the respective side walls A' of the head A.

To keep the spring O from sagging in the seat portion, the forward end thereof is securely fastened to the frame Q by means of staples $o$, and the spring is also held in place parallel with the side-rail section $d$ by means of the wire rod V and the wire straps $v$, whereby an efficient cushioned back is provided when the device is used as a chair, as shown by Fig. 9 of the drawings. In this figure it will be noted that the upper bend of the spring O rests upon the cables L to maintain proper relative arrangement of the parts.

In the operation and use of the invention a soft-hair or other mattress, as U, is employed and allowed to rest upon the spring O. By reason of the improved general construction and relative arrangement of the parts as herein set forth the advantages of the device will be readily understood by those conversant with the art of furniture-making. When the device is used as a bed, the folding top rails and the bottom telescopic rails are extended, as shown by Figs. 1 and 2 of the drawings, wherein it will be noted that the spring O is stretched taut to receive the mattress and bedclothing, and the rear sections of the rails D are held in rigid horizontal position by means of the blocks $A^2$ and $A^3$.

To convert the device into a chair, it is simply necessary to bend the upper side rails D into position, as illustrated by dotted lines, Fig. 2, of the drawings, (which operation is readily effected by means of the swinging hangers S,) and then force the box in a rearward direction until the parts assume the position illustrated by Fig. 9 of the drawings. When folded, the mattress acts as an efficient upholstered seat and back portion for the chair.

To disconnect the parts, it is simply necessary to disengage the hooks I from the knobs $g$ and pull the front part of the structure in a forward direction until the tongues of the lower rails $c^2$ leave the grooves of the plates E and H. Then by swinging the hangers S in a forward direction until they are approximately parallel with the rear sections of the upper rails D the said rails can be readily disengaged by moving the upper rails D in a rearward direction, whereby the studs $t$ of the brackets T will leave the sockets of the hangers S.

I do not confine myself to the specific details of mere mechanical construction and design as herein shown and described, as it is obvious that under the scope of my invention I am entitled to slight structural variations.

Having thus described my invention, what I claim as new, and desire to secure by Letters Patent, is—

1. A chair-bedstead, comprising a stationary head embodying upright sides and cross-beams, and extensible lower rails comprising respectively sliding sections with upper and lower grooves, and the clamps connecting them, and a sliding seat portion connected to the outer ends of the said sections, and upper rails comprising respectively two folding sections, connected together, plates and toothed segments connecting them, and means for detachably connecting the said lower rails to the sides of the said head, and means for pivotally attaching the upper rails to said sides, and a woven-wire spring, substantially as shown and described.

2. A chair-bedstead, comprising a stationary head embodying upright sides and cross-beams, an extensible lower framework comprising slides having upper and lower grooves and clamps connecting them, a sliding chair-box having a swinging frame therein, an upper framework embodying folding rails, a cross-beam connecting said rails, brackets with studs thereon connected to the said upper rails and the cross-beam, and swinging hangers having sockets therein for engagement with the said studs, and a woven-wire spring, and spiral springs supporting the said swinging frame of the chair-box, substantially as shown and described.

3. As a chair-bedstead, the combination with a stationary head and a sliding box, of telescopic lower rails and folding top rails which connect the head to the box, and swinging hangers detachably connecting the folding top rails to the said head, and the blocks for holding the folding rails in horizontal position, substantially as shown and described.

4. As a chair-bedstead, the combination with a woven-wire spring, of a stationary head and a sliding box, a swinging frame within said box, and springs supporting said frame, and folding top rails and telescopic bottom rails, and swinging hangers connecting the folding top rails to the head and pivots connecting them to the box, and means permanently connecting the telescopic rails to the box, and tongue-and-groove devices connecting them to the head, whereby the parts can be readily disconnected, substantially as shown and described.

5. A chair-bedstead comprising a stationary head embodying upright sides and cross-beams, and extensible lower rails comprising respectively sliding sections with upper and lower grooves, and the clamps connecting them, and a sliding seat portion connected to the outer ends of said sections, and upper rails comprising respectively two folding sections connected together, plates and toothed segments connecting them, and a U-shaped cross-bar connecting said plates, and means for detachably connecting the said lower rails to the sides of the said head, and means for pivotally attaching the upper rails to said sides, and a mattress-supporting spring, substantially as shown and described.

In testimony that I claim the foregoing as my invention I have signed my name, in presence of two witnesses, this 4th day of December, 1900.

RICHARD J. WELLES.

Witnesses:
BELLE PATERSON,
SOPHIE HARNISCH.